United States Patent
Vasella

(10) Patent No.: US 8,243,208 B2
(45) Date of Patent: Aug. 14, 2012

(54) SELECTABLE AUDIO OUTPUT CONFIGURATION

(75) Inventor: Mauro Alcide Vasella, Zurich (CH)

(73) Assignee: Thomson Licensing, Boulogne Billancourt (FR)

( * ) Notice: Subject to any disclaimer, the term of this patent is extended or adjusted under 35 U.S.C. 154(b) by 882 days.

(21) Appl. No.: 10/586,930

(22) PCT Filed: Jan. 4, 2005

(86) PCT No.: PCT/EP2005/000815
§ 371 (c)(1),
(2), (4) Date: Sep. 2, 2008

(87) PCT Pub. No.: WO2005/071953
PCT Pub. Date: Aug. 4, 2005

(65) Prior Publication Data
US 2008/0316367 A1     Dec. 25, 2008

Related U.S. Application Data

(60) Provisional application No. 60/538,563, filed on Jan. 23, 2004.

(51) Int. Cl.
*H04N 5/60* (2006.01)
*H04N 5/268* (2006.01)

(52) U.S. Cl. .......................... 348/738; 348/705

(58) Field of Classification Search ............. 348/738, 348/705, 706, 707, 731, 553, 552, 484
See application file for complete search history.

(56) References Cited

U.S. PATENT DOCUMENTS

| | | | |
|---|---|---|---|
| 5,615,107 A | 3/1997 | Deangelis et al. | |
| 5,754,256 A | 5/1998 | Kim | |
| 6,034,737 A * | 3/2000 | Koyama et al. | 348/552 |
| 6,118,496 A | 9/2000 | Ho | |
| 6,473,135 B1 | 10/2002 | Iwamujra | |
| 6,763,400 B2 * | 7/2004 | Numano et al. | 710/14 |
| 2003/0179283 A1 | 9/2003 | Seidel et al. | |
| 2003/0197811 A1 | 10/2003 | Hoover et al. | |

FOREIGN PATENT DOCUMENTS

| | | |
|---|---|---|
| EP | 0 986 255 A | 3/2000 |
| FR | 2 799 588 A | 4/2001 |
| JP | 6-253222 | 9/1994 |
| JP | 7-95494 | 4/1995 |
| JP | P2001-86416 A | 3/2001 |
| JP | 2001-197574 | 7/2001 |
| JP | 2003-187521 A | 7/2003 |
| JP | 2003-309892 | 10/2003 |
| JP | P2003-309892 A | 10/2003 |
| KR | 2003-0071075 | 9/2003 |
| WO | WO 2004/008746 A | 1/2004 |

OTHER PUBLICATIONS

Search Report May 23, 2005.

* cited by examiner

*Primary Examiner* — Michael Lee
(74) *Attorney, Agent, or Firm* — Robert D. Shedd; Joseph J. Opalach; Reitseng Lin

(57) ABSTRACT

An audio/video apparatus such as a television apparatus includes two or more auxiliary audio inputs (AUX1, AUX2, and AUX3) for receiving respective audio signals, an audio output, and a switch arrangement for selecting one of a broadcast audio signal and the auxiliary audio input signals. The audio/video apparatus operates in two modes. In the first mode where the audio/video apparatus is turned on, the switch arrangement selects one of the auxiliary audio input signals and a broadcast audio signal in response to a user command, and in the second mode where the audio/video apparatus is turned off, the switch arrangement selects a predetermined one of the auxiliary audio input signals.

12 Claims, 4 Drawing Sheets

SELECTABLE AUDIO OUTPUT CONFIGURATION

CROSS REFERENCE TO RELATED APPLICATION

This application claims the benefit, under 35 U.S.C. §365 of International Application PCT/EP2005/000815, filed Jan. 4, 2005, which was published in accordance with PCT Article 21(2) on Aug. 4, 2005 in English, and claims priority of 60/538,563 filed Jan. 23, 2004.

This application claims priority to and all benefits accruing from a provisional application filed in the United States Patent and Trademark Office on Jan. 23, 2004, and there assigned Ser. No. 60/538,563.

BACKGROUND OF THE INVENTION

1. Field of the Invention

The present invention generally relates to selecting an audio output from one or more external audio inputs in an audio/video apparatus, in particularly, during a standby mode or power-off mode.

2. Background Information

In a home environment, a user may connect several auxiliary audio/video devices, such as DVD (Digital Versatile Disc) players, set-top boxes, CD (Compact Disc) players, MP3 players, and karaoke machines, to a main audio/video device, such as a television apparatus, which then connected to a hi-fi amplifier. This way, all the audio/video devices can share the same hi-fi amplifier.

A disadvantage of the above configuration is that the television apparatus can select one of the audio input signals to be connected to the hi-fi amplifier when the television apparatus is turned on, but is unable to make such a selection, when the television apparatus is turned off or unplugged. Thus, even if a user wants to enjoy only the audio from one of the auxiliary audio/video apparatuses without concerning the video, the user may still have to perform one of the following. First, the user may have to turn on the television apparatus 10, but that constitutes waste of energy because the user is not watching the video. Second, the user may remove the audio output of the desired auxiliary audio/video device from the television apparatus and reconnect the output to the hi-fi amplifier, but that is troublesome because the user has to move the connection cables back and forth. Finally, instead of connecting audio outputs of the auxiliary audio/video devices to the television apparatus, the user may connect the audio output of each of the auxiliary audio/video devices to an input of the hi-fi amplifier, but that is inconvenient because the outputs of an auxiliary audio/video device would have to go to two different apparatuses: the audio to the hi-fi amplifier and the video to the television apparatus, making the connection arrangement unnecessarily complicated. As such, there is a need to have a television apparatus having the ability to connect one of the auxiliary audio inputs to an audio output of the television apparatus when the television apparatus is turned off, but without significantly increasing the cost of the television apparatus.

SUMMARY OF THE INVENTION

In accordance with an aspect of the present invention, an audio/video apparatus includes first and second audio inputs for receiving respective first and second audio signals, an audio output, and a switch arrangement for selecting one of the two audio inputs. The audio/video device operates in two modes. In the first mode, the switch arrangement selects one of the two inputs and a broadcast audio signal in response to a user command, and in the second mode, the switch arrangement selects a pre-determined one of the two input audio signals.

In the first mode, the audio/video apparatus is turned on, and in the second mode, the audio/video apparatus is either turned off or unplugged. The audio/video apparatus, illustratively, is a television apparatus.

Another embodiment of the invention is an audio/video system including an audio/video apparatus as stated above but with only one audio input, and an audio amplifier is coupled to the output of the audio/video apparatus, wherein, in a first mode of operation, the switch arrangement selects one of the input audio signal and an broadcast signal for output in response to a user request, and in the second mode of operation, the switch arrangement selects the audio input.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
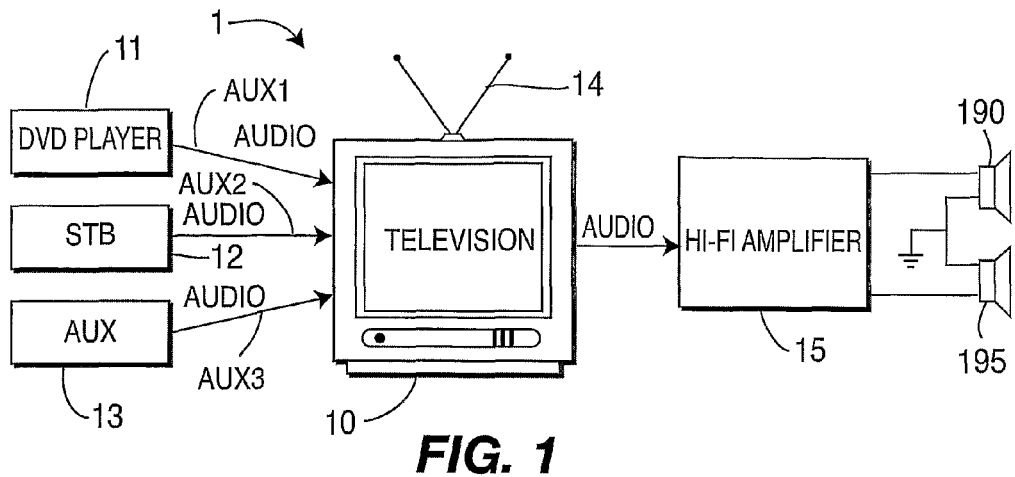
FIG. 1 is an exemplary audio/video system suitable for implementing the present invention.

The exemplifications set out herein illustrate preferred embodiments of the invention, and such exemplifications are not to be construed as limiting the scope of the invention in any manner.

Corresponding reference characters indicate corresponding parts throughout the several views. Although the drawings represent embodiments of the invention, the drawings are not necessarily to scale and certain features may be exaggerated in order to better illustrate and explain the invention. The exemplifications set out herein illustrate various embodiments of the invention, but such exemplifications are not to be construed as limiting the scope of the invention in any manner.

DETAILED DESCRIPTION

FIG. 1 shows an example of an audio/video system 1 according to the principles of the invention. The system 1 includes an audio/video apparatus such as but not limited to a television apparatus 10, a hi-fi amplifier 15, a left loudspeaker 190, a right loudspeaker 195, and three auxiliary audio/video devices 11-13: a DVD (Digital Versatile Disc) player 11, a set-up box (STB) 12, and an auxiliary audio/video device 13, which may be a karaoke machine.

The television apparatus 10 includes three audio/video inputs: one (AUX1) from the DVD player 11, one (AUX2) from the set-top box 12, and the other (AUX3) from auxiliary equipment 11. In addition, the television apparatus 10 also includes an antenna 14 for receiving a broadcast audio/video signal, the audio portion of which should be conventionally processed to produce a baseband audio signal that is acceptable to the hi-fi amplifier 15. The television apparatus 10 includes an audio output coupled to an input of the hi-fi amplifier 15, which outputs left and right audio signals to drive the left and right loudspeakers 190 and 195, respectively. Although three auxiliary audio/video inputs are shown, the television apparatus 10 may have any number of audio/video inputs.

The television apparatus 10 has two modes of operation. In the first mode of operation, the television apparatus 10 selects one of the audio signals from the audio/video apparatuses 11-13 and the processed broadcast audio signal, and outputs the selected audio/video signals via the audio output in response to a user command. The video signal, of course, is displayed in a display device, which can be integrated into the television apparatus 10, as shown, or a device separated from the television apparatus 10. The selected audio signal is then coupled to the hi-fi amplifier 15. In the following discussion, only the audio switching is described to highlight the situation that a user is only interested in audio.

According to the principles of the invention, in the second mode of operation, the television apparatus selects a predefined one of the audio inputs from the audio/video apparatus 11-13, regardless of user entered commands.

Illustratively, the first mode of operation is the mode, in which the television apparatus 10 is turned on, and the second mode of the operation is the mode, in which the television apparatus 10 has been turned off. When the television apparatus is turned on, all circuitries in the television apparatus 10 derive power from a main power supply. When the television apparatus is turned off, the television apparatus 10 may be still connected to an external power source. In this case, although the main power supply is not available, a standby power is still available to a processor of the television apparatus 10, so that the processor can detect a power-on or power-toggle control signal and turns on the television apparatus 10 in response to a user command. However, the standby power is not available to other circuitries in the television apparatus 10. If the television apparatus is turned off and is unplugged from an external power supply, both main power and standby power are not available to all circuitries in the television apparatus 10. For simplicity, the main power supply, the standby power supply, the external power source, and the processor are not shown in FIG. 1.

According to the principles of the invention, in the second mode of operation, whether the standby power is available or not, the television apparatus 10 selects a predetermined one of the audio signals from the audio/video apparatus 11-13 for output to the hi-fi amplifier 15.

Figure 2:
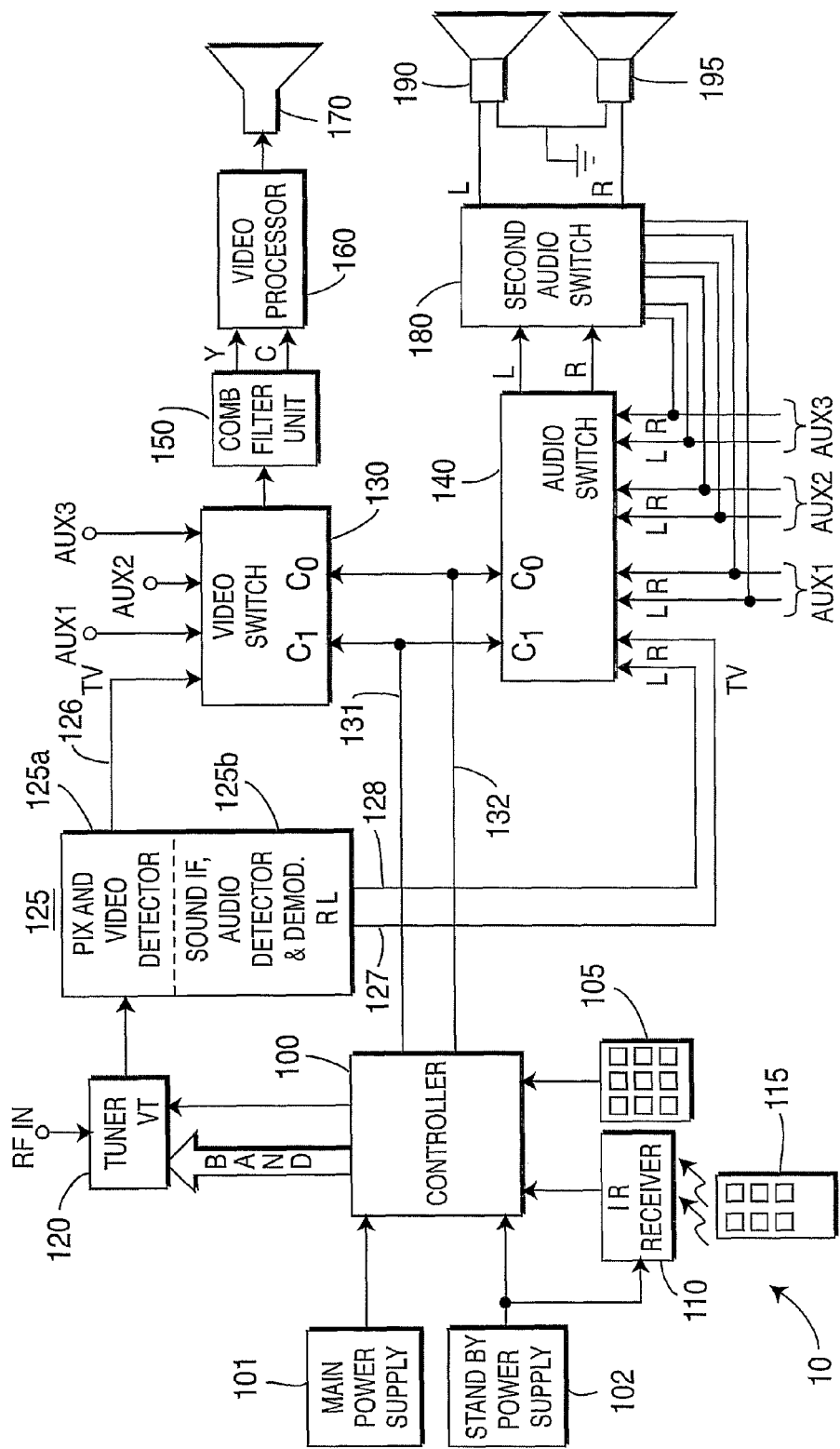
FIG. 2 is an exemplary embodiment of the television apparatus shown in FIG. 1.

FIG. 2 shows an illustrative embodiment of the television apparatus 10 shown in FIG. 1. The television apparatus 10 includes a controller 100 for receiving user-entered control signals from a local keyboard 105 and from an infrared (IR) receiver 110. The IR receiver 110 receives and decodes remote control signals transmitted by a remote control unit 115. The controller 100, which may be a microprocessor or microcomputer, causes a television tuner 120 to select a particular RF signal to be tuned in response to data entered by a user. The tuner 120 produces a signal at an intermediate frequency (IF) and applies it to a processing unit 125 comprising a first section 125a including a picture (PIX) amplifying stage and video detector, and a second section 125b including, a sound amplifying stage, an audio detector and a stereo decoder. The processing unit 125 produces a baseband video signal (TV), and baseband left and right audio signals.

The baseband video signal (TV) is coupled via line 126 to one input of a four input video switch 130. The baseband left and right audio signals are applied to one pair of inputs of an audio switch 140 capable of selecting a pair of inputs from four pairs of audio inputs. The video switch 130 and the audio switch 140 each have three other inputs labeled AUX1, AUX2 and AUX3, for receiving respective baseband video and audio signals from external sources. Each of the inputs of video switch 130 and audio switch 140 is selectable in response to binary signals generated by controller 100 and applied to control inputs $C_1$ and $C_0$ via conductors 131 and 132, respectively. For example, if $C_1$ and $C_0$ are both caused to be at a low signal level (i.e. binary 00), then the TV input is selected. If $C_1$ is low and $C_0$ high (binary 01), then AUX1 is selected. If $C_1$ is high and $C_0$ low (binary 10), then AUX2 is selected. If both $C_1$ and $C_0$ are high (binary 11), then AUX3 is selected. The selection of corresponding video and audio signals is ensured because the control lines 231 and 232 are coupled to respective control inputs $C_1$ and $C_0$ of both video switch 130 and audio switch 140.

The selected video signal is applied to a comb filter unit 150 which separates luminance (Y) signals and chrominance (C) signals for application to a video processor unit 160 for ultimate display on a display screen of a display device 170. The selected audio signals are applied to a second audio switch arrangement 180.

The second audio switch arrangement 180 illustratively includes four inputs: one from the output of the audio switch 140, and the other three respectively from AUX1, AUX2, and AUX3. The switch arrangement 180 selects one of the four inputs and the selected audio signal is ultimately reproduced via the speakers 190 and 195 through the hi-fi amplifier 15 (not shown in FIG. 2). The selected audio signal may also be coupled to internal speakers (not shown). Although all three inputs from AUX1, AUX2, and AUX3 are shown to be coupled to the second switch arrangement 180, other arrangements are possible. For example, a manufacturer may choose to couple only one or two of the three auxiliary audio inputs to the second audio arrangement 180 for cost saving or other purposes.

The television apparatus 10 also includes a main power supply 101 for supplying main power and a standby power supply 102 for supplying standby power, both deriving power from an external power source (not shown), such as a 110-volt AC power source. The main power is available to all circuitries in the television apparatus 10. The standby power is available to a few circuitries in the television apparatus 10, such as the controller 100 and IR receiver 110, to save energy. For simplicity the connection of the main power to other circuitries in the television apparatus 10 is not shown in FIG. 2.

In the first mode of operation, both the main and standby power supplies provide operational power. The main power is available to all components in the television apparatus 10.

In the second mode of operation, if the external power supply is still available, even though the main power supply 101 does not generate the main power, the standby power supply 102 should continue to supply the standby power. However, the standby power is only available to the controller 100 and the IR receiver 110, so that the controller 100 can detect a power-on or power-toggle control signal from the remote control unit 115 or the local keyboard 105, and turns on a switch (not shown) to connect the main power supply 101 to the external source, in effect, turning on the television apparatus 10. The standby power is not available to audio switch 140 and other circuitries. The audio switch 140 is a switch that is unable to connect an input to an output when the operational power is not available. For example, the audio switch 140 may be an electronic switch, including, for example, CMOS transistors, such as part CD4066 made by Texas Instruments. Without the operational power, an electronic switch should not be able to connect an input to an output.

When the external power is not available (for example, the television apparatus 10 is unplugged), both main and standby powers are not available, and the audio switch 140 is again unable to connect an input signal to its output.

As such, in the second mode of operation, the audio switch 140 cannot connect an input to the output. However, since one or more of the AUX1, AUX2, and AUX3 inputs are coupled to the inputs of the second audio switch arrangement 180, one of the signals from AUX1, AUX2, and AUX3 is selected, even if the main power and/or the standby power are not available, according to the principles of the invention.

Figure 3:
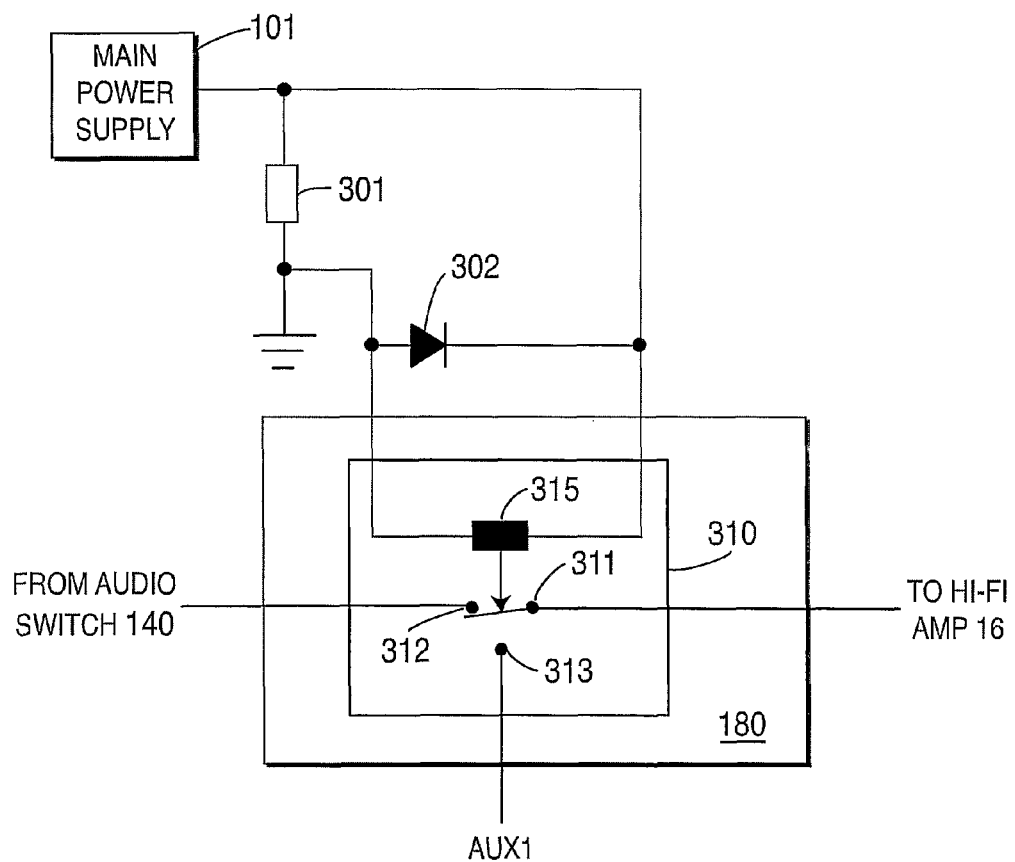
FIG. 3 is an exemplary embodiment of the second audio switch arrangement shown in FIG. 2.

FIG. 3 illustrates an embodiment of the second audio switch arrangement 180, which includes an electromechanical switch 310, illustratively a solenoid switch or a relay. The electromechanical switch 310 includes a solenoid 315, which when charged, connects an input terminal 312 to an output terminal 311, and when discharged, connects an input terminal 313 to the output terminal 311. The input terminal 312, the input terminal 313, and the output terminal 311 are illustratively coupled to the output of the audio switch 140, the AUX1 input, and an input of the hi-fi amplifier 15.

The solenoid 315 receives operational power from the main power supply 101, where a resistor 310 and a diode 302 are added to protect the electromechanical switch 310 and the main power supply 101. The resistor 301 symbolizes the residuary load of the apparatus.

In operation, if the main power supply 101 is operating, i.e., in the first mode of operation, the solenoid 315 is charged, forcing the electromechanical switch 310 to connect the input terminal 312 and the output terminal 311, in effect, connecting the audio signal from the audio switch 140 to the hi-fi amplifier 15. If the main power supply is not operating, i.e., in the second mode, the solenoid is not charged and the switch 310 connects the input terminal 313 to the output terminal 311, in effect, connecting the audio signal from the AUX1 input to the hi-fi amplifier 15 even though the television apparatus may be in a standby mode where the standby power is available or in a power-off mode where no standby power is available, for example, when the television apparatus 10 is unplugged.

Although AUX1 is illustratively coupled to the second switch arrangement 180, any one of the AUX inputs can be selected for coupling to the second audio switch arrangement 180.

Figure 4:
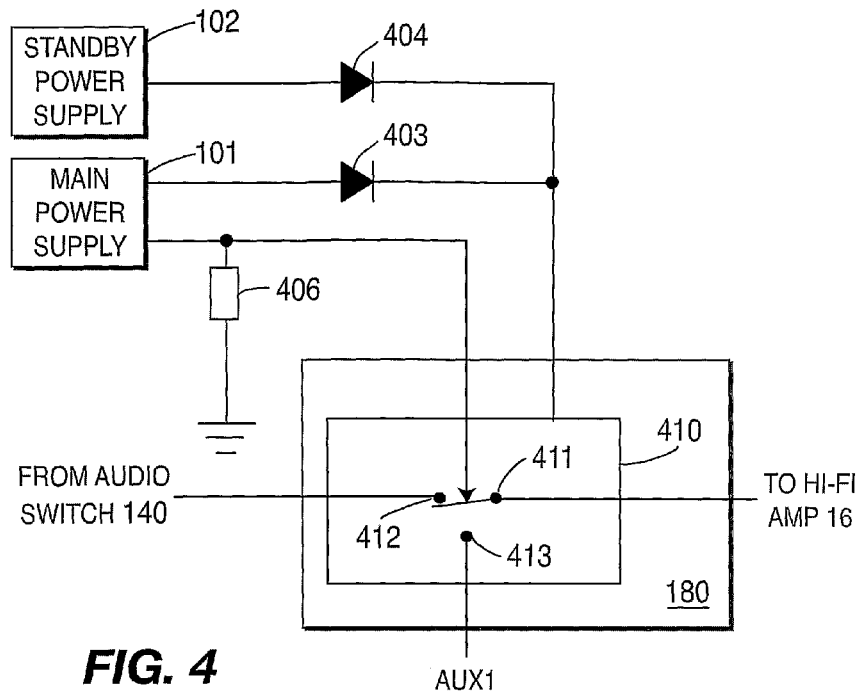
FIG. 4 is another exemplary embodiment of the second audio switch arrangement shown in FIG. 2.

FIG. 4 illustrates another embodiment of the second audio switch arrangement 180 that can achieve the same effect as the one shown in FIG. 3, when the standby power supply 102 is operating. In this embodiment, a solid state switch 410 is used but other electronic switches can be used as well. An example of a solid state switch that can be used in this embodiment is a 2:1 analog multiplexer, for example, part SN74AUC2G53 from Texas Instruments, Dallas Tex., USA. This kind of solid state switches has an operating power input and a control input. It may also include an inhibiting input, which should be set low in normal working condition. Responding to low and high signal levels provided to the control input, the switch 410 respectively connects the input terminal 412 and the input terminal 413 to the output terminal 411. However, when operating power is not available to the operating power input, the switch 410 does not connect an input to the output terminal 411.

In this embodiment, both main and standby power supplies 101 and 102 provides power to the operating power input of the switch 410 through respective diodes 403 and 404. The diodes 403 and 404 prevent current from flowing back to the main and auxiliary power supplies 101 and 102 for protecting these two power supplies. The main power supply 101 also supplies the control signal to the control input of the switch 410. The pull down resistor 406 is responsible to provide a defined low signal level when the main power supply is turned off. If the main power supply 101 has a low impedance control signal output, no pull down resistor is needed.

In operation, if both the main power supply 101 and the standby power supply 102 are operating, i.e., in the first mode, the switch arrangement 180 connects the output of the audio switch 140 to an input of the hi-fi amplifier 15. If the main power supply 101 is not operating, i.e., in the second mode, but the standby power supply 102 is operating, the switch arrangement 180 connects the audio signal from the AUX1 input to an input of the hi-fi amplifier 15. However, if both the main power supply 101 and the standby power supply 102 are not operational, the switch arrangement 180 does not connect any input audio signal to the hi-fi amplifier 15. Thus, if a user turns off the television apparatus 10 and leave the television apparatus 10 plugged, the user should be able to enjoy the audio feature from a pre-wired one of the three auxiliary audio inputs, but if the user disconnects the external power source from the television apparatus 10, the user should not be able to listen to the audio from the pre-wired auxiliary audio input.

Figure 5:
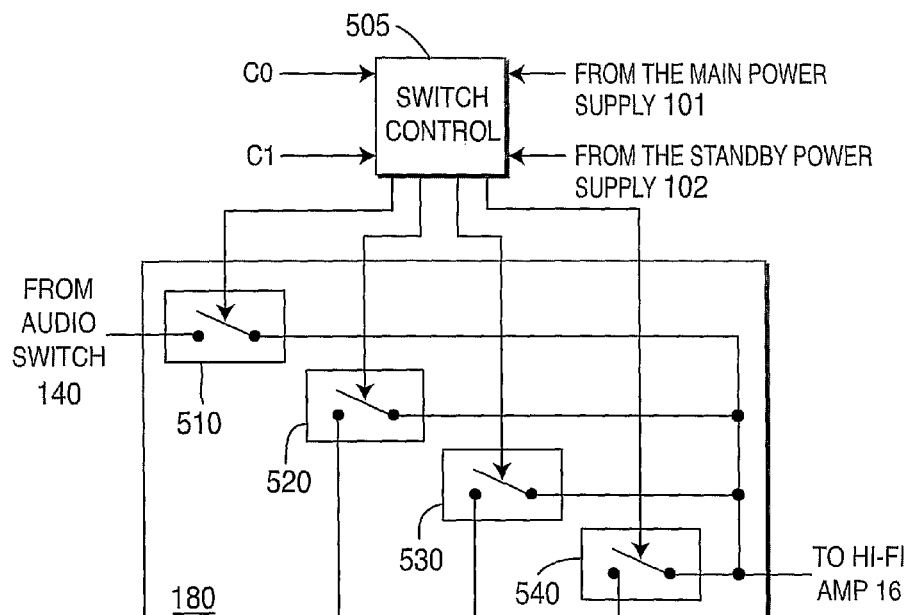
FIG. 5 is yet another exemplary embodiment of the second audio switch arrangement shown in FIG. 2.

FIG. 5 illustrates another embodiment of the second switch arrangement 180, where all auxiliary inputs are coupled to the switch arrangement 180. The switch arrangement 180 in this embodiment includes four switches 510, 520, 530, and 540, each having an output terminal coupled to an input of the hi-fi amplifier 15, and having an input terminal. The input terminals of the four switches are respectively coupled to the output for the audio switch 140, AUX1, AUX2, and AUX 3. The four switches receive necessary power from a switch control 505, which also receives the switch control signals $C_0$ and $C_1$ from the controller 100, and power from both the main power supply 101 and the standby power supply 102. Instead of sharing the same switch control signals $C_0$ and $C_1$ with the audio switch 140, the second switch arrangement 180 may be controlled by a separate set of control signals from the controller 100 or another controller (not shown).

In operation, when the main power is available, the switch control 505 supplies necessary power to close the switch 510, but no power to the other three switches regardless of the state of the control signals $C_0$ and $C_1$, leaving the other three switches not in a close position. As a result, the switch arrangement 180 connects the output from the audio switch 140 to an input terminal of the hi-fi amplifier 15.

When the main power is not available but the standby power is available, the switch control supplies necessary power to one of the four switches according to the state of the control signals $C_0$ and $C_1$. For example, if $C_1$ and $C_0$ are both caused to be at a low signal level (i.e. binary 00), then the switch control 505 supplies power to the switch 510, connecting the output from the audio switch 140 to the hi-fi amplifier 15. Of course, in this case, no audio signal is coming from the output of the audio switch 140, because the main power is not available to operate the audio switch 140. If $C_1$ is low and $C_0$ high (binary 01), then the switch control 505 supplies power to operate the switch 520 connecting AUX1 to hi-fi amplifier 15. If $C_1$ is high and $C_0$ low (binary 10), then the switch control 505 supplies power to operate the switch 530 connecting AUX2 to hi-fi amplifier 15. If both $C_1$ and $C_0$ are high (binary 11), the switch control 505 supplies power to operate the switch 540, connecting AUX3 to hi-fi amplifier 15.

The switch control 505 can be illustratively implemented using digital logic, for example, using a field programmable logic array.

Note that if both the main power and the standby power are not available and if solid state switches such as the one shown in FIG. 4 are used, the switch arrangement 180 does not connect any input signal to the hi-fi amplifier 15. An exemplary electronic switch package that can be used in this embodiment is a CD4066 CMOS quad bilateral switch made by Texas Instruments, Dallas, Tex., USA. However, if electromechanical switches such as the one shown in FIG. 3 are used, a pre-defined one of the four switches can be made in a close position and other three in an open position when both main and standby powers are not available.

The desired input to be selected when the main power is not available can be saved in a non-volatile memory, such as an electrically erasable programmable read only memory (EEPROM). When the processor detects that the television apparatus 10 is in the second mode, the processor 100 also retrieves the setting from the memory and generates necessary control signals to close the corresponding switch. The setting can be preset in a factory and saved in the memory. The setting can be unchangeable by a user or changeable by a user through a user interface such as OSD (On-Screen Display) menu using the remote unit 115 or the local keyboard 105. As an alternative, the controller 100 can simply receives control commands from the remote control unit 100 or the local keyboard 105 to dynamically select the audio input desired by the user.

Figure 6:
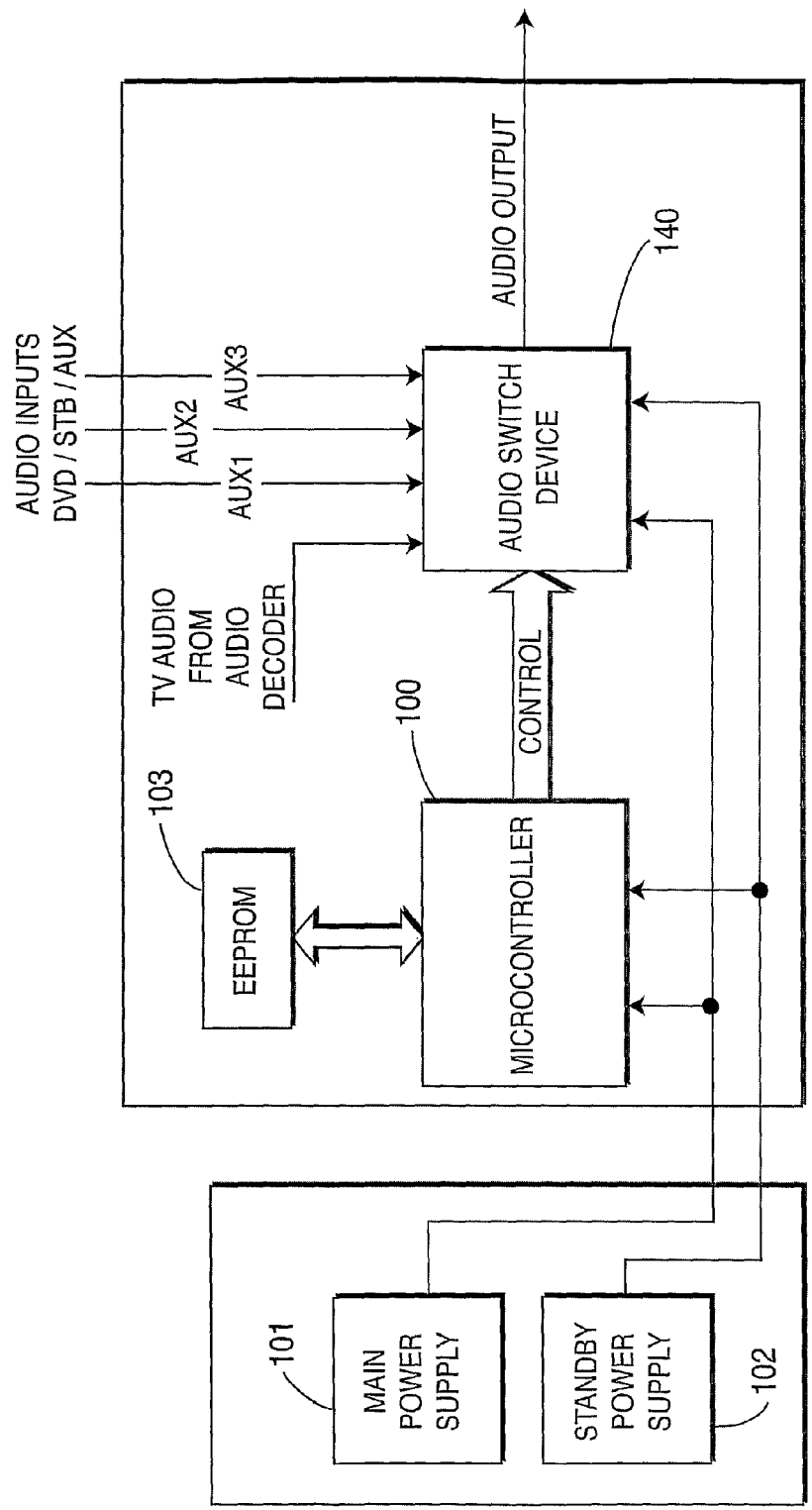
FIG. 6 is another exemplary embodiment of the television apparatus shown in FIG. 2 but without the second audio switch arrangement.

All the examples discussed above have a common advantage: the television apparatus 10 is similar to a conventional television apparatus, except that the second audio switch arrangement 180 and the associated interface circuits are added. As such, the existing circuits in a television apparatus do not have to be modified. If modifying the existing circuits is not a concern, the second audio switch arrangement 180 may be eliminated, simply by supplying the standby power to the audio switch 140, so that the audio switch 140 is still operative when the main power is not available. An example of such an arrangement is shown in FIG. 6, where the audio switch 140, like the processor (shown as a microprocessor) 100, receives both the main power and the standby power. Also shown in FIG. 6 is an EEPROM 103 to be used for predefining which audio input to be selected when the main power is not available, as described earlier. The AUX1, AUX 2, and AUX3 inputs are illustratively connected to a DVD player, a set-top box, and an auxiliary audio/video apparatus in FIG. 6. In this embodiment, the audio switch 140 may use a similar switch arrangement shown in FIG. 5.

As described herein, the present invention provides an audio/video apparatus having audio switch arrangement that can connect an audio input to an audio output of the audio/video apparatus, even if the audio/video apparatus is in standby mode or has the external power supply disconnected. The audio/video apparatus illustratively is a television apparatus having a display, but it can be applicable to television apparatus without a integrated display, but having one auxiliary audio input and a tuner for receiving a broadcast signal, or two or more auxiliary audio inputs, such as set-top boxes, video cassette recorders (VCRs), DVD players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An audio/video apparatus having first and second modes of operation and capable of receiving a broadcast audio signal, the apparatus comprising:
    first (AUX1) and second (AUX2) audio inputs for receiving first and second audio signals;
    a switch arrangement for selecting one of the first audio signal, the second audio signal, and the a broadcast audio signal; and
    an audio output for outputting the selected audio signal, wherein in the first mode of operation where power necessary to operate the audio/video apparatus is applied to the audio/video apparatus and the audio/video apparatus is turned on, the switch arrangement selects one of the first audio signal, the second audio signal, and the broadcast audio signal in response to a user command, and in the second mode of operation where the power is not applied to the audio/video apparatus causing the audio/video apparatus inoperable, the switch arrangement defaults to a predetermined position to select one of the first and second audio signals; and
    wherein the switch arrangement comprises an electronic switch for selecting one of the first input audio signal, the second audio signal, and the broadcast audio signal, and a second switch having a first input terminal coupled to an output of the electronic switch, a second input terminal coupled to one of the first (AUX1) and second (AUX2) audio inputs, and an output terminal coupled to the audio output, wherein when the audio/video apparatus is in the first mode, the output terminal of the second switch is coupled to the first input terminal of the second switch, and when the audio/video apparatus is in the second mode, the output terminal of the second switch is coupled to the second input terminal of the second switch.

2. The audio/video apparatus of claim 1, wherein the switch arrangement is irresponsive to user commands when the apparatus is in the second mode.

3. The audio/video apparatus of claim 1, wherein the switch arrangement comprises transistors.

4. The audio/video apparatus of claim 1, wherein the second switch is a solenoid switch, and in the second mode, the solenoid switch connects the output terminal to the second input terminal of the second switch.

5. The audio/video apparatus of claim 1, wherein the second switch includes a third input terminal coupled to a different one of the first (AUX1) and second (AUX2) audio inputs, and when the audio/video apparatus is in the second mode, the output terminal of the second switch is coupled to a predefined one of the second and third terminals.

6. The audio/video apparatus of claim 5, wherein the second switch includes first, second, and third solid state switches controlled by a controller, each switch having an input terminal and an output terminal, the output terminals of the first, second, and third electronic switches are joined to form the output terminal of the second switch, the input terminal of the first solid state switch is the second terminal of the second switch, the input terminal of the second solid state switch is the third terminal of the second switch, and the input terminal of the third solid state switch is the first input terminal of the second switch.

7. The audio/video apparatus of claim 6, wherein the controller turns on the third solid state switch when the audio/video apparatus is turned on, and turns on one of the first and second solid state switches when the audio/video apparatus is turned off according to information stored in a memory.

8. The audio/video apparatus of claim 1, wherein the audio output is coupled to an audio amplifier.

9. A television apparatus having first and second modes of operation, the television apparatus comprising:
   first audio input (AUX1) for receiving a first audio signal;
   an audio output;
   a main power source for supplying main power and a standby power source for supplying standby power, the main power and the standby power being derived from external power being applied to the television apparatus;
   a first switch for selecting one of the first audio signal and a broadcast audio signal and having an output terminal for outputting the selected audio signal;
   a second switch having a first input terminal coupled to the output terminal of the first switch, a second input terminal coupled to the first audio input (AUX1), and an output terminal coupled to the audio output, wherein
   in the first mode of operation where the external power is applied to the television apparatus, the first switch selects one of the first audio signal and the broadcast audio signal in response to a user command and the second switch is operated to couple the output terminal of the second switch to the first input terminal of the second switch, and in the second mode of operation where the external power is not applied to the television apparatus causing the television apparatus inoperable, the second switch defaults to couple the second input terminal of the second switch to the output terminal of the second switch; and
   wherein when the television apparatus is turned off, the output terminal of the second switch is coupled to the second input terminal of the second switch.

10. The television apparatus of claim 9, wherein the second switch is not controlled by a controller in the television apparatus.

11. The television apparatus of claim 9, wherein the first switch is inoperative when the main power is not available but the second switch is operative when one of the main and standby powers is available.

12. An audio/video system having first and second modes of operation, the system comprising:
   a television apparatus having a first audio input (AUX1) for receiving first audio signal; a switch arrangement for selecting one of the first audio signal and a broadcast audio signal; and an audio output for outputting the selected audio signal; and
   an audio amplifier coupled to the audio output of the television apparatus, wherein
   in the first mode of operation where power necessary to operate the television apparatus is applied to the television apparatus, the switch arrangement selects one of the first audio signal and the broadcast audio signal in response to a user command, and in the second mode of operation where the power is not applied to the television apparatus causing the television apparatus inoperable, the switch arrangement defaults to select the first audio signal; and
   wherein the switch arrangement comprises an electronic switch for selecting one of the first input audio signal and the broadcast audio signal, and a second switch having a first input terminal coupled to an output of the first switch, a second terminal coupled to the first audio input (AUX1), and an output terminal coupled to the audio output, wherein when the television apparatus is turned on the output terminal of the second switch is coupled to the first terminal, and when the television apparatus is turned off, the output terminal of the second switch is coupled to the second terminal.

* * * * *